Nov. 6, 1934.   J. E. TRAINER ET AL   1,979,424
PIPE SECTION
Filed March 1, 1934   3 Sheets-Sheet 1

INVENTOR
James E. Trainer
BY Charles M. Day
ATTORNEY

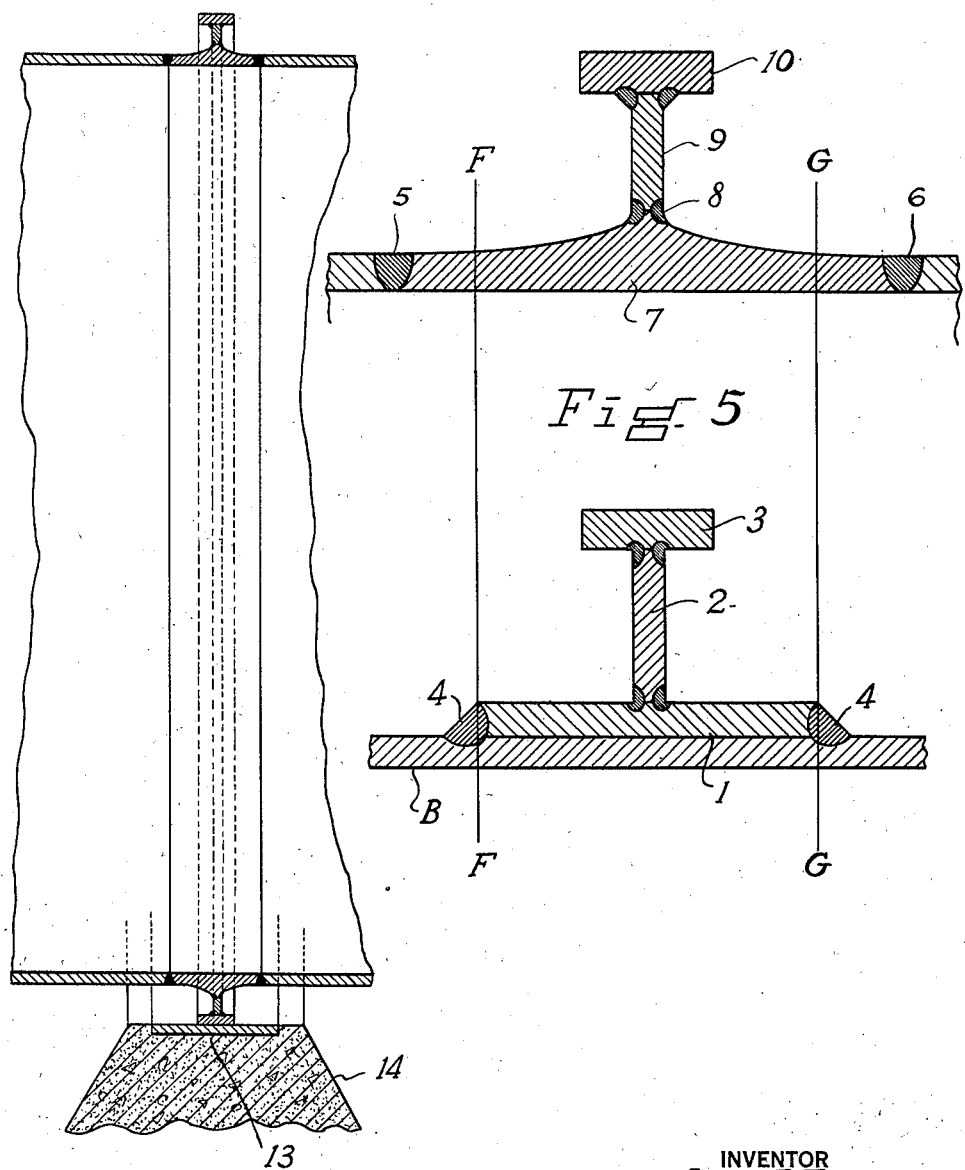

Nov. 6, 1934.　　　J. E. TRAINER ET AL　　　1,979,424
PIPE SECTION
Filed March 1, 1934　　　3 Sheets-Sheet 3

INVENTOR
James E. Trainer
BY Charles M. Day
ATTORNEY

Patented Nov. 6, 1934

1,979,424

UNITED STATES PATENT OFFICE 1,979,424

PIPE SECTION

James E. Trainer, Akron, Ohio, and Charles M. Day, Denver, Colo., assignors, by direct and mesne assignments, to The Babcock & Wilcox Company, Newark, N. J., a corporation of New Jersey Application March 1, 1934, Serial No. 713,478

8 Claims. (Cl. 285—111)

This invention relates to the supporting, stiffening, and sustaining of conduits or penstocks of large diameter.

In conduits or penstocks of such diameter as, for instance 30 feet, and of the type to be used at the Boulder Canyon Project, United States Department of the Interior, Bureau of Reclamation, the conduit or penstock is built up of contiguous sections of cylindrical form, each section being 24 feet long with a wall thickness of approximately 3 inch steel, the total 24 foot section weighing in the neighborhood of 300,000 pounds and subjected to internal fluid pressure of over 300 pounds.

In connection with such construction as is above mentioned, it will be appreciated that line or plane localization of any stresses resulting from internal pressure, beam effect, or tendency of the conduit to become oval in shape afford a location or locations at which the factor of safety must be far beyond that which would be required at other points in the conduit.

An object of the present invention is to so relate supporting, sustaining and stiffening means with respect to the conduit so that instead of line or plane localizations of such stresses there is an appreciable unit of area over which the same are distributed as compared with the usual method of simply circumscribing the conduit or penstock with a reinforcing band.

In the present invention an object is to distribute the fixed stresses to eliminate localization of the same, and to more particularly produce a transition zone of gradually increasing thickness from minimum to maximum without incorporating any abrupt change in wall thickness which would have the effect of inherently localizing the stress effects without provision for distribution over an appreciable unit area.

In addition, the invention contemplates a composite conduit of joined cylindrical sections, preferably welded, forming an integral whole in such a manner that there is interposed at intervals throughout the whole and at locations best adapted for supporting, sustaining and stiffening the whole, sections which vary in wall thickness with respect to the major portion of the conduit and produce a gradual zone of transition from minimum to maximum wall thickness circumferentially or from minimum to maximum to minimum.

In the accompanying drawings there is illustrated, somewhat diagrammatically, a method and means of carrying the present invention into practice.

In the drawings:

Fig. 3 is a longitudinal section of a portion of a conduit or penstock incorporating the stiffener ring according to the present invention.

Fig. 4 is an enlarged sectional view showing the method of constructing and incorporating the supporting or stiffening rings in the conduit or penstock.

Fig. 5 is a similar view showing one method formerly used.

In the drawings:

Figure 1:
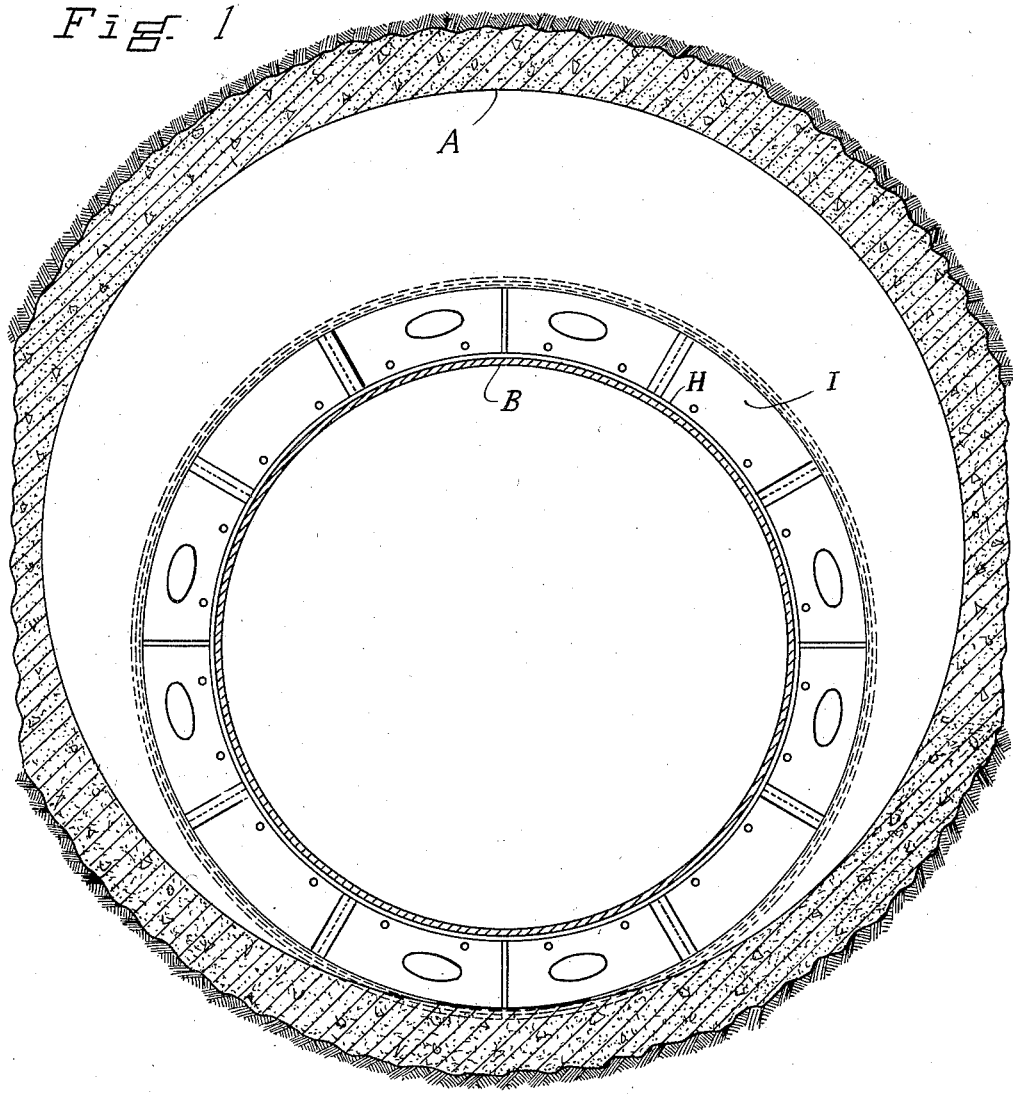
Fig. 1 is an end view in section showing a plan of a conduit at a supported location.
Figure 2:
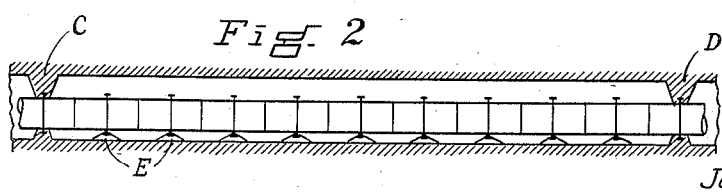
Fig. 2 is a sectional side elevation showing the conduit or penstock in place within the tunnel with the use of stiffener rings between supported points.
Figure 6:
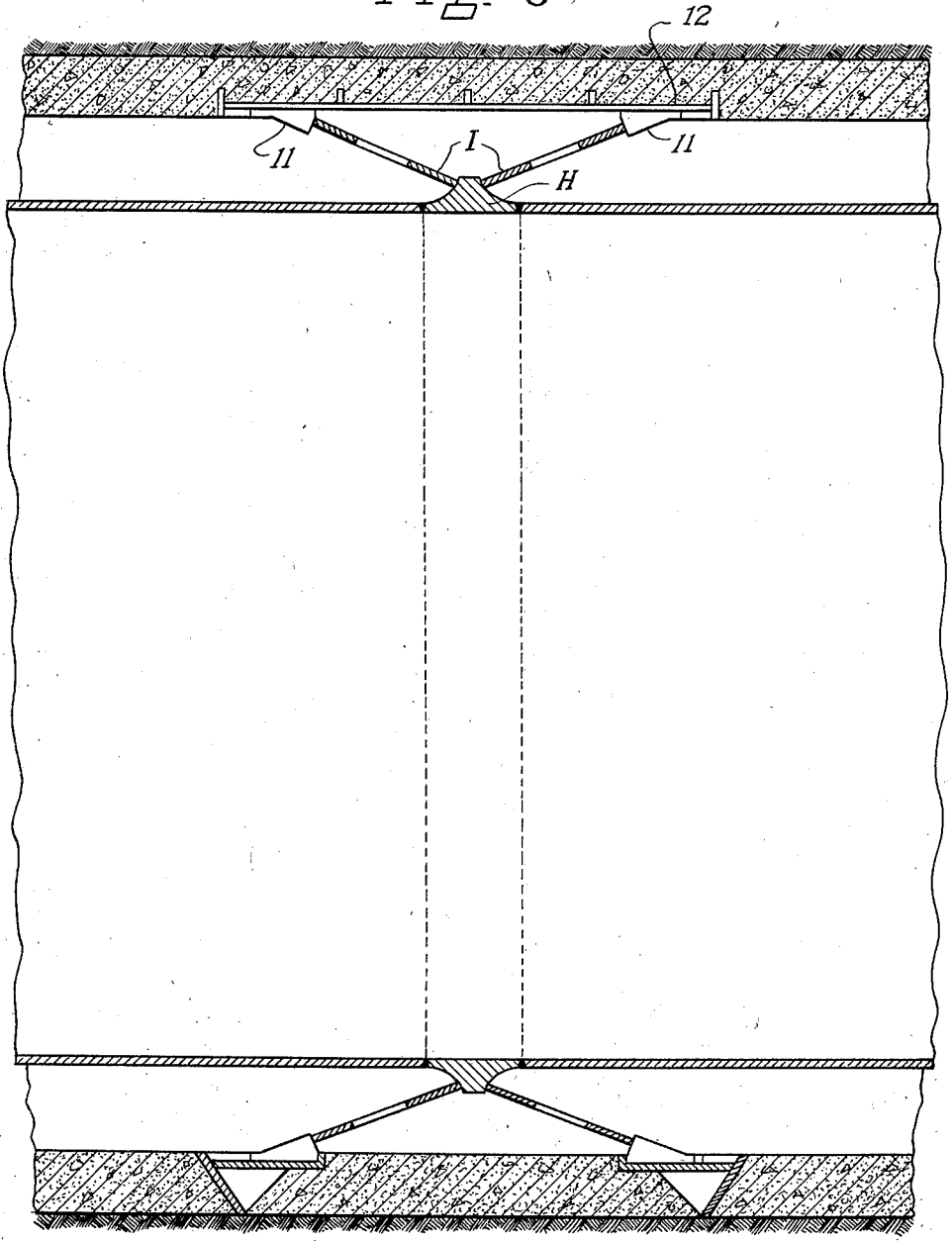
Fig. 6 is a view similar to Fig. 3 but at the supporting location disclosed in Figs. 1 and 2.

A represents a concrete lined tunnel housing; a large diameter conduit or penstock B is supported at spaced intervals C and D, these being fixed points between which, if otherwise unstiffened or not supported, there would be a tendency of the conduit to form a catenary resulting in tension and compression stresses throughout the intermediate portion; while at the supported locations there would be a reversal of these stresses they would still, nevertheless, be present due to the beam effect or fulcrum effect at the supporting locations.

To take care of these stresses without having to incorporate in the conduit wall a thickness adequate to otherwise compensate for the factor of safety required, it is proposed to locate between the fixed supporting points C and D a number of auxiliary or supplementary supporting locations E.

Ordinarily, and in the original specification #534 of the Boulder Canyon Project there was incorporated in plates 24403—45—D—1765 and 24423—45—D—1785 designs and suggestions for stiffener rings on the supporting sections which contemplate circumscribing bands with abrupt edges and having a thickness approximately equaling that of the plate, as indicated in Fig. 5 hereof.

With such a construction it is obvious that the tension and/or compression and/or internal pressure would localize the stresses in a plane, or in planes FF and GG as indicated in Fig. 5 producing, in effect, the same character of weakness in the conduit structure as a whole, at these locations, as would be caused by a deliberate notching of the conduit at these locations and, in addition, there would be the condition of having to apply the welding to a zone in which such stresses are concentrated.

Such a supporting or stiffener ring is indicated in Fig. 5 wherein B represents the conduit wall, 1 the circumscribing stiffener band, 2 the flange and 3 the rim all welded together and to the conduit as indicated at 4.

With this construction, it will be obvious that the greatest stresses and consequently the tendency to deform and rupture is localized in the planes FF and GG.

In the present invention, there is shown, incorporated between the normal sections of the conduit or penstock, and welded as indicated at 5 and 6, a stiffener section 7 having its thickest portion at the center periphery thereof and tapering down at its edges to the thickness of the conduit wall B. Welded to the thickest portion as indicated at 8 is a flange 9 surmounted by a ring 10.

From the foregoing it will be observed that if such sections as are illustrated in Fig. 4 are incorporated at spaced intervals as an integral part of the conduit or penstock, the result is that stresses of the character mentioned, instead of being localized in planes FF and GG as pointed out in connection with Fig. 5 are distributed lineally along the length of this incorporated thickened section and which is proportioned to easily take care of stresses and strains without undue thickness of metal or labor incident to applying a separate constricting band.

In building up the conduit or penstock such a stiffener is incorporated at the supporting point H and is used in connection with dished rings I resting against members 11 at opposite sides of the joint and bearing on plates 12 incorporated in the concrete, such rings serving as load carrying supports while between these supports there are located stiffening sections such as shown in Fig. 3, and one of which is more minutely described in connection with Fig. 4 and which, for approximately half its circumference, may rest upon a bearing plate 13 in a concrete pier 14.

It will be observed from the foregoing that once the section shown in Figs. 3 and 4 is incorporated in the conduit or penstock it becomes an integral part thereof eliminating weaknesses due to suddenness of stress variations by eliminating abrupt changes in thickness and carrying the stresses and strains throughout a relatively large area. Also the stiffener section is of sufficient lineal dimension to carry the welds 5 and 6 beyond the area of imposed stress; this further increases the efficiency and desirability of this invention over the type of stiffener and supporting member disclosed in Fig. 5.

From the foregoing it will also be obvious that the invention is equally applicable to the stiffening or supporting of large tanks where there are bending stresses or internal stresses or both.

While in the foregoing, we have described a specific embodiment of stiffener ring it will, nevertheless, be clear that departures therefrom may be made without avoiding the intent and scope of the appended claims defining the invention.

What we claim is:

1. A conduit comprising two parts, and an insert secured therebetween and constituting a part of the conduit, said insert conforming on the inside of the conduit to the uniform contour of the inner wall of the conduit and graduated in thickness from its joints with the conduit parts toward a midsection, the maximum thickness thereof being at the mid-section.

2. A conduit comprising two parts and an insert secured therebetween and constituting a part of the conduit, said insert conforming on the inside of the conduit to the uniform contour of the inner wall of the conduit and graduated in thickness from the thickness of the walls of the conduit parts to a maximum thickness at a midsection, the metal on opposite sides of the aforesaid mid-section being uniformly distributed to produce symmetrical sides.

3. A conduit comprising annular parts and an inserted ring joining the same, said ring having a wall thickness at the joints uniform with the wall thickness of the parts and graduated in thickness from the joints toward a mid-section thereof having a maximum thickness.

4. A conduit comprising two annular parts and an inserted ring joining the same, said ring presenting an interior surface corresponding in cross-section with the cross-section of the interior surface of the parts joined and having its end walls of uniform thickness with the wall thickness of the parts joined and graduated in thickness from its end walls toward a mid-section of maximum thickness, the ring and parts being welded together at their junctures.

5. A conduit comprising two parts, and an insert therebetween and constituting a part of the conduit, said insert conforming on the inside of the conduit to the uniform contour of the inner wall of the conduit and graduated in wall thickness substantially from its joints with the parts toward an intermediate section of maximum wall thickness.

6. A supported conduit comprising two parts, and an insert therebetween and constituting a part of the conduit, said insert conforming on the inside of the conduit to the uniform contour of the inner wall of the conduit and graduating in wall thickness substantially from its joints with the parts toward an intermediate section of maximum wall thickness, and a support for the conduit engaging the zone of maximum wall thickness.

7. A supported conduit comprising two parts, and an insert therebetween and constituting a part of the conduit, said insert conforming on the inside of the conduit to the uniform contour of the inner wall of the conduit and graduating in wall thickness substantially from its joints with the parts toward an intermediate section of maximum wall thickness, a member secured to the conduit at the zone of maximum wall thickness, and a supporting rest engaging said member.

8. A conduit comprising two parts, and an insert therebetween and constituting a part of the conduit, said insert having its inside cross-sectional configuration of the passage in a plane passing through the insert normal to the axis of an area throughout at the most only the same as the cross sectional area of the conduit passage at a correspondingly disposed plane, and graduating in wall thickness substantially from its joint with the parts toward an intermediate section of maximum wall thickness.

JAMES E. TRAINER.
CHARLES M. DAY.